US010113358B1

(12) United States Patent
Silverberg et al.

(10) Patent No.: US 10,113,358 B1
(45) Date of Patent: Oct. 30, 2018

(54) WINDOW BLINDS WITH EXTENDABLE EDGES

(71) Applicants: Al Silverberg, Paradise Valley, AZ (US); Rick Steele, Mesa, AZ (US)

(72) Inventors: Al Silverberg, Paradise Valley, AZ (US); Rick Steele, Mesa, AZ (US)

(73) Assignee: Ristal, Inc., Tempe, AZ (US)

( * ) Notice: Subject to any disclaimer, the term of this patent is extended or adjusted under 35 U.S.C. 154(b) by 127 days.

(21) Appl. No.: 14/523,639

(22) Filed: Oct. 24, 2014

(51) Int. Cl.

| | |
|---|---|
| ***E06B 9/262*** | (2006.01) |
| ***E06B 9/26*** | (2006.01) |
| ***B32B 37/14*** | (2006.01) |
| ***E06B 9/266*** | (2006.01) |

(52) U.S. Cl.
CPC .............. *E06B 9/26* (2013.01); *B32B 37/142* (2013.01); *E06B 9/266* (2013.01); *E06B 2009/2627* (2013.01)

(58) Field of Classification Search
CPC .. E06B 9/262; E06B 9/386; E06B 2009/2435; E06B 2009/2625; E06B 2009/2627
USPC .................................................... 160/236, 39
See application file for complete search history.

(56) References Cited

U.S. PATENT DOCUMENTS

| | | | | |
|---|---|---|---|---|
| 3,946,788 A * | 3/1976 | Van Muyen | E06B 9/262 | 160/84.04 |
| 5,273,097 A * | 12/1993 | Siegler | E06B 9/262 | 160/84.01 |
| 5,649,584 A * | 7/1997 | Leubecker | B60J 1/2091 | 160/370.23 |
| 5,834,090 A * | 11/1998 | Huang | 428/116 | |
| 5,845,694 A * | 12/1998 | Cohen | E06B 9/303 | 160/168.1 R |
| 6,866,079 B2 * | 3/2005 | Lee | 160/178.1 R | |
| 2005/0194107 A1 * | 9/2005 | Nien | 160/236 | |
| 2006/0010782 A1 * | 1/2006 | Nien et al. | 52/3 | |
| 2007/0113989 A1 * | 5/2007 | Kuen | 160/168.1 R | |
| 2009/0008040 A1 * | 1/2009 | Lin | E06B 9/262 | 160/236 |
| 2011/0203744 A1 * | 8/2011 | Lee | 160/172 R | |

FOREIGN PATENT DOCUMENTS

| | | |
|---|---|---|
| EP | 0491096 A1 | 6/1992 |

* cited by examiner

*Primary Examiner* — Katherine W Mitchell
*Assistant Examiner* — Jeremy C Ramsey
(74) *Attorney, Agent, or Firm* — Frost Brown Todd LLC

(57) ABSTRACT

A window shade with extendable edges or inserts is described. A set of cellular inserts 2 are slidably displaced within the cells 12 of a honeycomb shade 10. The inserts 2 have a cross-sectional shape similar to the cross-sectional shape of the honeycomb shade cells 12. The inserts 2 extend within the cells longitudinally a distance 22. At a distal edge 6 of the honeycomb shade 12 the inserts 2 are connected together. A notch 5 is attached to the inserts along near distal edge 6. The notch 5 allows a user to pull the inserts 2 in a uniform manner out from the cells 12 of the honeycomb shade 10 a preferred extended distance 66. The user is thereby able to extend the sunblocking ability of the honeycomb shade.

15 Claims, 7 Drawing Sheets

WINDOW BLINDS WITH EXTENDABLE EDGES

TECHNICAL FIELD

The present disclosure is directed to shades and blinds for windows. In particular, the invention relates to extendable inserts for window shades to provide increased coverage capabilities of the shade.

BACKGROUND OF THE INVENTION

There are numerous ways for consumers to cover the windows of their homes. Curtains are popular, as are various types of shades and blinds. Most window coverings take one of two approaches: extend vertically from the top or bottom of a window, or extend horizontally from the right or left hand side of a window. Curtains, for example, often comprise two large pieces of fabric, attached to a horizontal bar above a window. The pieces of fabric can be displaced along the horizontal bar to cover the window and block the sunlight entering. Alternatively, the pieces of fabric can be positioned to the side or edge of the window allowing sunlight to enter a room. There are also vertical blinds. Vertical blinds are a series of long flat strips of material (often plastic), usually measuring several inches in width, and at least several feet in length, hanging lengthwise and perpendicular to the floor from a rail system positioned above a window. The rail system allows the blinds to be moved in front of the window to block sunlight. The blinds are often rotatable about their hanging connection to the rail system. Other types of coverings extend vertically from the bottom or top of a window. Roller blinds, honeycomb shades, roman blinds, venetian blinds, and others move vertically up and down in front of a window.

Users choose to cover their windows for a variety of reasons. Sunlight entering through a window may raise the temperature of a room and the user may wish to cool the room temperature. Users may wish to watch a movie or other program on a television and blocking sunlight can make for a more enjoyable watching experience. A user may wish to block sunlight because it is entering a room at eye level and distracting a person working at a desk.

There are numerous control systems for window covers. Track blinds are common as they allow slats to be moved along a track to cover a window or to the side of the window and allow sunlight through. Many coverings like venetian blinds use a turning rod for adjusting the angle of the slats while lift cords lower or raise the slats vertically in front of the window. Honeycomb shades often require lift cords but not a turning rod. Roller binds use cords to lower and raise the blind. When raised, the roller blind rolls into a roll near the top of a window in a stowed position. Roman blinds often use lift cords. Roman blinds can be raised vertically into a stowed position near the top of a window, similar to roller blinds. But with Roman blinds the pieces of fabric resemble long rectangles of material and when stowed can appear like a pile of fabric planks or a slightly askew pile of several pieces of paper.

Window coverings can use various materials. Venetian blinds and honeycomb shades can use plastic, wood, fabric or other materials. Curtains most often use some type of fabric or textile. Venetian blinds are constructed with a series of slats, often plastic or wood. Roman blinds often use a textile but can also use plastics and woods.

One problem in the prior art is that each type of window covering will have a weakness in blocking sunlight. Venetian blinds often have small spaces between the slats where sunlight can enter. Blinds can also sometimes be sized improperly or aren't available in the exact size needed by a user. Honeycomb shades and other blinds can often let sunlight pass around the edges of the shade.

Another problem in the prior art is that very few systems are adjustable in terms of the coverage area they offer. For example, honeycomb shades have a fixed coverage area. Once a size of honeycomb shade is chosen, 2 feet by 3 feet for example, the shade is not extendable beyond that area. A honeycomb shade may be displaceable vertically, extended in full coverage, or pulled into its stowed position. But once a honeycomb shade is extended vertically it cannot extend any further in a horizontal direction. Similarly, once a set of curtains is installed they have a fixed coverage area which cannot be extended. The lack of adjustability on window coverings can be a problem because light often comes through the sides of the window cover. There is a need for a window cover with increased adjustability in terms of the coverage area it offers. Some of the prior art offers solutions for venetian blinds. For example, EP 0 491 096 Al and US 2007/0113989 Al disclose venetian style blinds with adjustable widths. These applications do not offer a solution for honeycomb shades. Furthermore, the solutions described require adjustment of each slat in a venetian blind separately - this can be a time-consuming task. Some users prefer honeycomb shades for aesthetic reasons. In addition, honeycomb shades can collect less dust than venetian blinds.

Another problem is that some windows are so large that one window cover cannot cover it. In these situations several sets of blinds are often hung next to each other vertically to cover the window. In these situations there is a gap of space between each vertically hung set of blinds. This allows unwanted sunlight to enter. There is a need for a blind that, in these circumstances, can be adjusted to cover the gaps.

A further problem with some window coverings is the tendency to collect large amounts of dust. Venetian blinds are particularly susceptible to this. Dusting off each horizontal slat individually can be arduous.

BRIEF SUMMARY OF THE INVENTION

In a preferred embodiment of the invention a window shade having extendable edges is described. The window shade comprises a shade body comprised of a plurality of collapsible tubular cells stacked to form a vertical shade, each of the tubular cells having at least one open distal end. An insert comprises a second plurality of collapsible tubular cells, each of the insert cells sized to insert into the open distal end of the tubular cells of the shade body. The inserts can extend a distance beyond the distal end of the shade body to increase the effective width of the window shade. Furthermore, the insert can be moved relative to the shade body to vary the distance.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
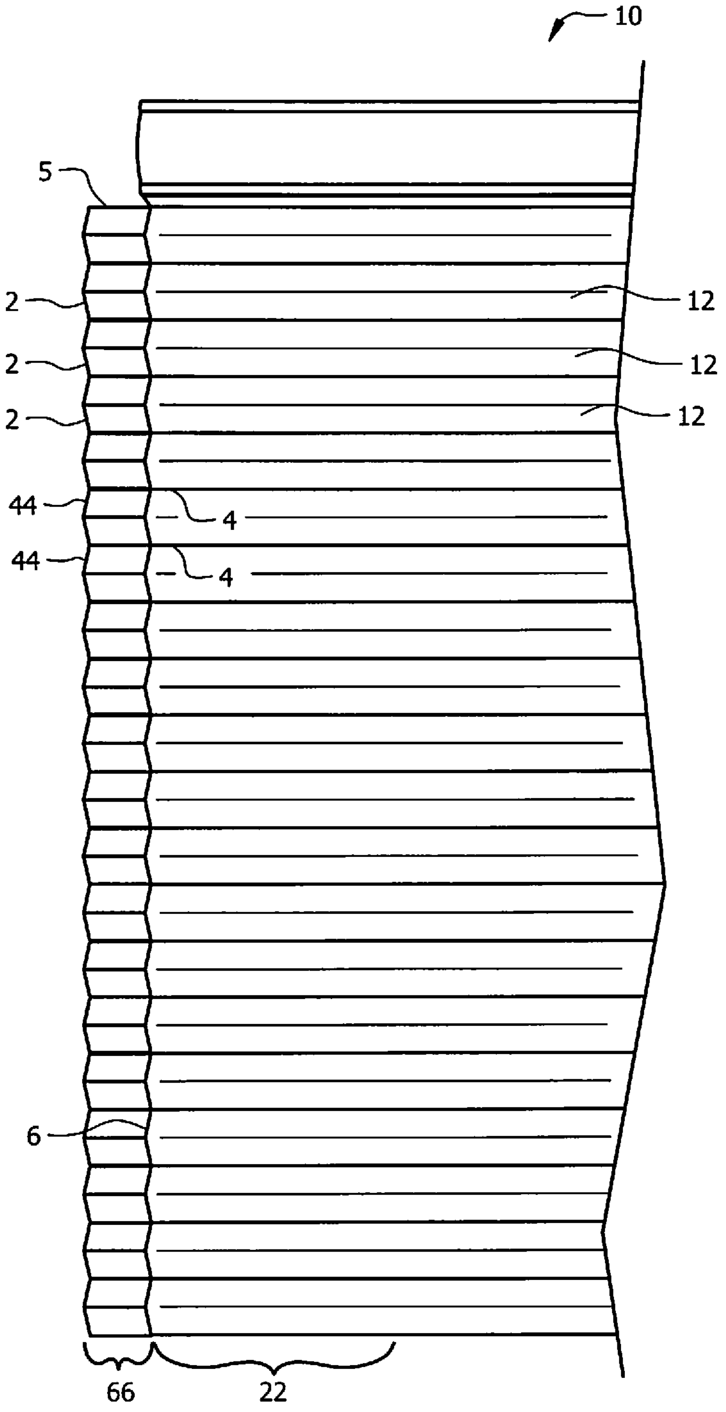
FIG. 1 is a front-view of a preferred embodiment of a window shade according to the concepts described herein.

The current invention relates to a shade with extendable edges or inserts. The extendable inserts can maintain the same approximate cross-sectional shape and pattern of the shade. In a preferred embodiment, a honeycomb shade with extendable edges is described. The extendable edges of the honeycomb shade are comprised of a series of cellular inserts, with a cross-sectional shape slightly smaller than the honeycomb cells of a honeycomb shade, such that the inserts can fit within the cells of a honeycomb shade and be slidably extended out of the edges of the honeycomb shade. Thus extending the coverage area of the shade. This is accomplished while maintaining the appearance, shape, pattern and shading of the honeycomb shade.

Honeycomb shades are well known and provide an attractive window covering that blocks sunlight well and may collect less dust than other types of blinds. A honeycomb shade will typically be placed on the interior side of a window, although the invention will work with exterior honeycomb shades as well. Honeycomb shade cells generally have a hexagonally shaped cross-section. The cross-section of the entire honeycomb shade will often appear as a series of approximately hexagonally shaped cells piled vertically upon one another. Other shapes are possible for the cross-section of the shade cells. Various circular, square, and other shapes are possible as well. Other types of shades can be used with the invention as well, pleated shades for example. The shade portion of a honeycomb shade is usually composed of a fabric or textile. Strings or cords will be passed through the fabric of the shade and connected to a top and bottom rail portion. The strings or cords will be connected to pull-strings or draw-cords for lowering and raising, as is common in many types of shades and blinds. The pull-string will be extended through a top or bottom rail, often the top rail, and the user can pull the string, lifting the shade and bottom rail, and pulling the shade into a stowed position. When stowed, the fabric cells of a honeycomb shade flatten to take up much less space than when extended. The pull-string will be connected to a locking mechanism. Such that the shade can be locked in the stowed position. The user can then unlock the pull-string, often with a slight pull, allowing the string to lower the bottom rail and shade, extending the shade to cover a window and block sunlight. The locking mechanism allows a user to lock the shade at any chosen height. Various types of locking mechanisms and pull-string or draw-cord configurations are within the scope of the invention. Some pull-string configurations resemble a pulley system. Other configurations are loose-hanging cords, extending down from the top rail. Various locking mechanisms are used for blinds and shades and are well known in the prior art and can be used with the current invention. Honeycomb shades can take a top-down configuration, a bottom-up configuration, or another configuration. The invention is compatible with various of these configurations. Other window shades have cordless lift systems and the invention is adaptable to these configurations as well.

In some embodiments the extendable inserts will comprise cellular shaped inserts of six pleats. Other embodiments will comprise inserts of two pleats disposed vertically against the vertical edges of each honeycomb cell. The more edges or pleats that are used for each insert in each honeycomb cell the more sunlight that will be blocked. The invention can also be applied to double or multiple honeycomb shade configurations.

Referring now to FIG. 1, a preferred embodiment of the invention is shown. A set of cellular inserts 2 are shown, slidably displaced within the cells 12 of a honeycomb shade 10. The inserts 2 have a cross-sectional shape similar to the cross-sectional shape of the honeycomb shade cells 12. The inserts 2 extend within the cells longitudinally a distance 22. The distance 22 can extend from a few inches to approximately half the width of the honeycomb shade, but many different lengths are compatible with the invention. At a distal edge 6 of the honeycomb shade 12 the inserts 2 are connected together. A notch 5 is attached to the inserts along near distal edge 6. The notch 5 allows a user to pull the inserts 2 in a uniform manner out from the cells 12 of the honeycomb shade 10 a preferred extended distance 66. The user is thereby able to extend the sunblocking ability of the honeycomb shade.

Figure 2:
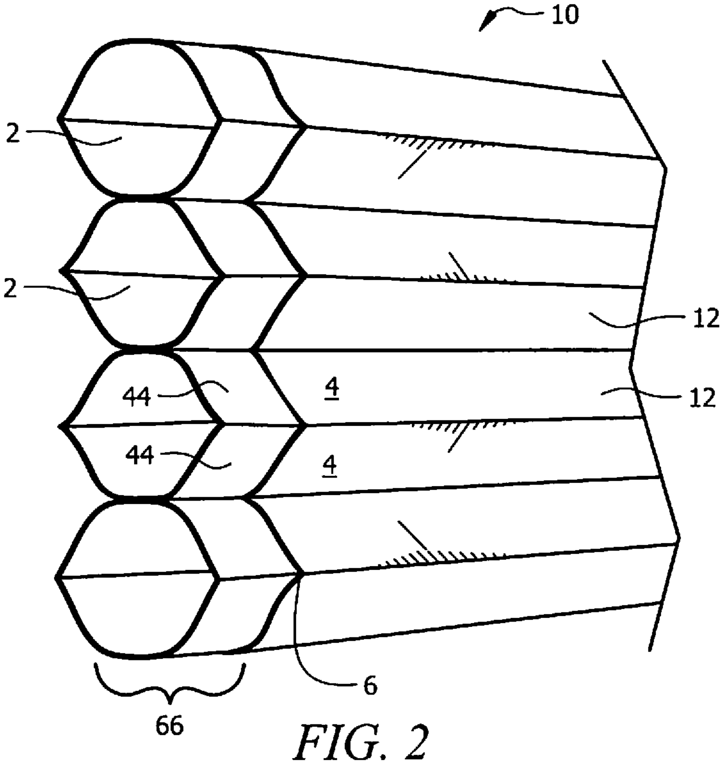
FIG. 2 is a close-up and angled side view of the widow shade of FIG. 1.

Referring now to FIG. 2, with continuing reference to FIG. 1, the cross-section of each cell 12 can be hexagonally shaped. Each cell has six sides or pleats 4. The top and bottom pleats of each cell 12 are connected to adjoining cells 12. The cells can be connected by means of various types of adhesives, a mechanical connection such as a staple or sewn connection. Alternatively, adjacent cells can share a pleat 4, such that the top pleat 4 of one cell 12 is the bottom pleat 4 of another cell 12, and so forth. In addition, the invention can be realized with inserts 2 that have no physical connection to adjacent inserts 2. Each cell has two pleats disposed toward the window and two pleats 4 disposed away from the window. These four pleats 4 will be generally vertically disposed when the shade 10 is extended and covering a window. When the shade 10 is pulled into its stowed position these four pleats 4 will fold flat into a horizontal position. The pleats 44 of the inserts 2 have a similar construction and can be pulled into a stowed position with the shade 10 and will fold flat.

Within each cell 12 is a cellular insert 2. The insert 2 has dimensions and shape approximately similar to the cross-section of the cells 12 of the honeycomb shade 10. The inserts 2 will likely be at least a little bit smaller than the honeycomb shade cells 12, allowing the inserts 2 to slide in and out of the cells 12. The inserts 2 have a similar shape as the cells 12, but embodiments wherein the insert 2 has a different shape or cross-section can be implemented as well. The inserts 2 extend inward, along the length of each cell a distance 22. Distance 22 can be any given distance preferred by a user but will often vary from a few inches up to approximately half the width of the honeycomb shade. The insert 2 should be long enough to help the user in expanding the coverage area of the honeycomb shade 10. The length of inserts 2 may be limited by practical considerations. Depending on the weights of the materials used to construct the honeycomb shade 10 and the inserts 2, an insert extending too far within or too far outside a cell 12 may prove too heavy and may deform the shade 10 or the insert 2 or may be unstable and fall out of the cells 12.

As shown in FIG. 1, inserts 2 within adjacent cells are connected at a distal edge 6 of the shade. This connection can take a variety of forms. It is possible to sew inserts together, or to use glue or an adhesive, or to use a staple, or any other appropriate means. Another form of connection is a cap covering and connecting all the edges of each insert. This cap could be formed of plastic. The edge of each insert may be glued into the cap.

A notch or nub 5 connected to the inserts 2. The nub 5 can provide the means for a user to manually slide the insert(s) 2 in and out of the honeycomb shade's cells 12. The user can thereby choose how much to extend the inserts 2, depending on how much sunlight to block or how much extra coverage is needed to cover the window. The nub 5 can take a variety of forms. As shown in FIG. 1, the nub 5 can extend upward from the topmost insert 2. Nub 5 could also extend sideways from the inserts 2 or extend downward from the bottom insert 2. Nub 5 can take a variety of forms and various shapes. A variety of materials can comprise nub 5 including plastic, wood or metal. The connection for nub 5 can take a variety of forms including glue, adhesive, staple or another mechanical connection.

Figure 3A:
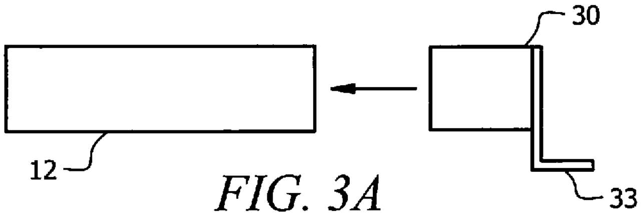
FIG. 3A is a top view of an alternate embodiment of a window shade and background piece according to the concepts described herein.
Figure 3B:
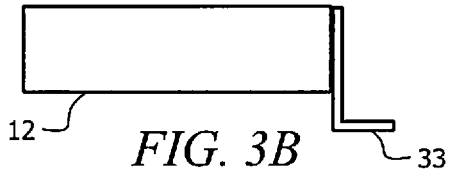
FIG. 3B is a top view of the shade and background piece of FIG. 3A inserted into the window shade.
Figure 4A:
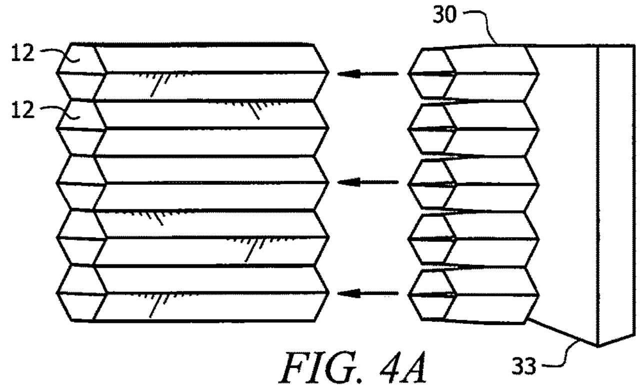
FIG. 4A is a front view of the background piece and window shade of FIG. 3A.
Figure 4B:
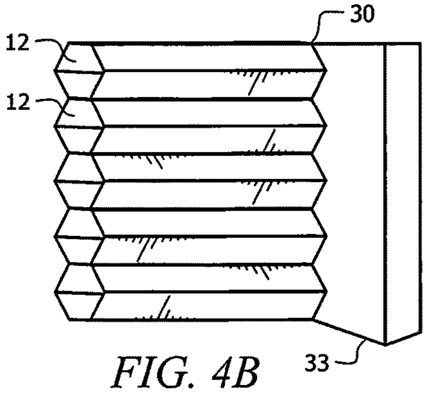
FIG. 4B is a front view of the background piece of FIG. 3A inserted into the window shade.

FIGS. 3A, 3B, 4A, and 4B show an embodiment of the invention including a background piece 30. Sometimes a large window requires multiple shades to cover it. In these situations the invention helps extend the coverage area of a shade 10 by use of inserts 2. In addition, background piece 30 can close the gap between two shades 10. Even when using inserts 2 to narrow the gap between two shades 10 there may still be a thin gap between shades 10 or inserts 2, allowing sunlight to pass through. Background piece 30, by attaching to inserts 2 or cells 12 in a shade 10 can close this gap. The extension 33 will extend behind (or in front of) a neighboring shade 10 or insert 2 to block the sunlight in that gap. As shown in FIGS. 3A, 3B, 4A, and 4B, background piece 30 can be placed in cells 12 or be integrated as an extension to inserts 2. Background piece 30 and extension 33 can extend the entire vertical length of shade 10. FIG. 3A shows a top down view of background piece 30 in close proximity to cell 12. FIG. 3B shows a top down view of background piece 30 inserted into cell 12. As can be seen, when cell 12 is next to a cell 12 of another shade 10, the background piece 30 and extension 33 can reach behind the neighboring shade 10 to block sunlight in the space between the shades. FIGS. 4A and 4B show a side-angular view of the embodiment in FIGS. 3A and 3B.

Figure 5A:
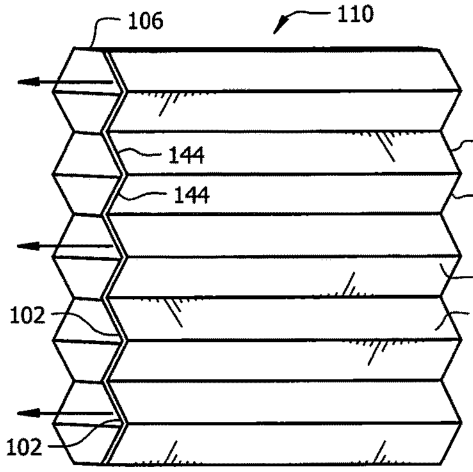
FIG. 5A is a front view of an alternate embodiment of a window shade and 2-pleat insert according to the concepts described herein.
Figure 5B:
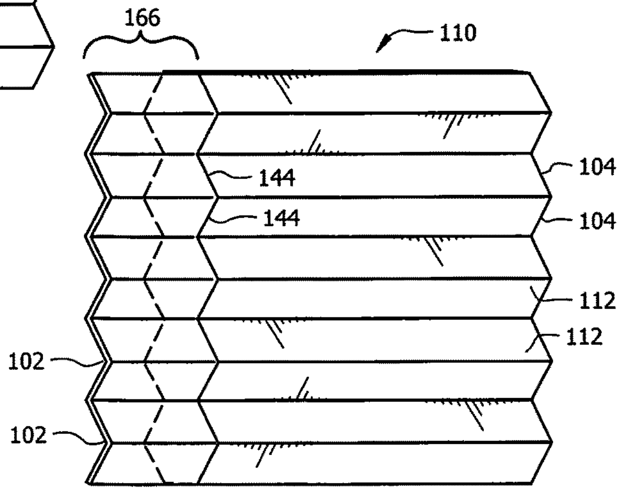
FIG. 5B is a front view of the insert of FIG. 5A extended from the window shade.

In another embodiment of the invention, as seen in FIGS. 5A and 5B, each insert 102 comprises two pleats 144 in each cell, not six pleats. In this embodiment the insert 102 comprises two vertically disposed pleats 144 along the window-facing edge of the cell 112. As in other embodiments, an insert 102 can be placed in each cell 112 of the honeycomb shade 110, and the inserts 102 connected together at a distal edge 106 of the shade 110. FIG. 5A shows the inserts 102 in a stowed position within the cells 112 of the shade 110. FIG. 5B shows the inserts 102 in an extended position for use to block sunlight. A nub 5 can be connected to the two pleat embodiment in similar ways to the six pleat embodiments.

Figure 6A:
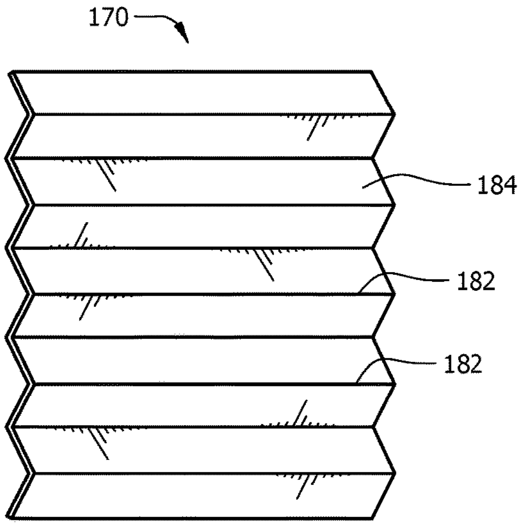
FIG. 6A is a front view of an alternate embodiment of the invention on a pleated shade.
Figure 6B:
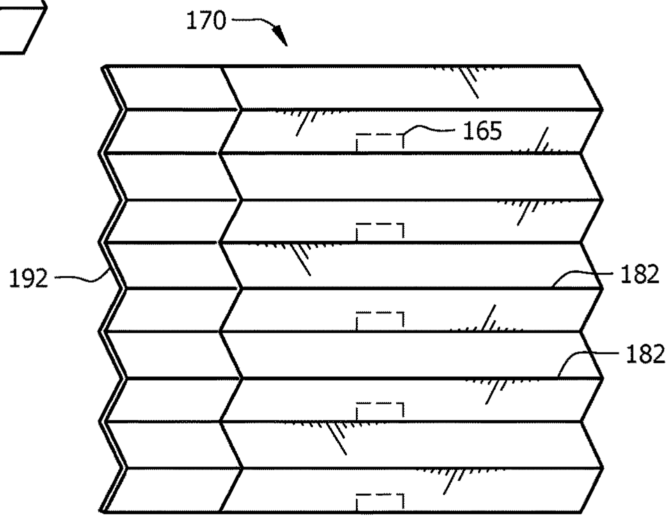
FIG. 6B is a front view of a pleated shade of FIG. 6A with an insert attached to the back and extending the edge of the shade.

Another embodiment of the invention, seen in FIGS. 6A and 6B is implemented on a pleated shade 170. In this embodiment the extendable edge or insert 192 is attached to the face or back of shade 170. The insert 192 closely matches the pleats 184 of shade 170. The attachment for insert 192 can comprise a variety of forms. Glues or various adhesives can be used. Mechanical connections such as staples or sewing are available as well.

One embodiment of the invention comprises a shade with a wider backing face than the front face. For example, in a honeycomb shade, the back face, comprising two pleats from each cell, will have a width of 26 inches. The front face will comprise full, six-pleated cells extending for a width of 24 inches. The extra two inches on the back can extend behind neighboring window shades, thereby blocking the sunlight passing through the gaps between the shades. This embodiment can be carried out with extra length on each distal edge of the shade, or just on one distal edge.

Figure 7A:
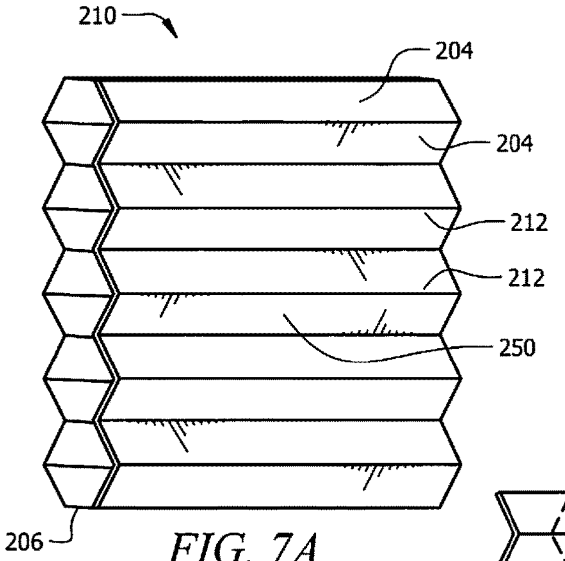
FIG. 7A is a front view of an alternate embodiment of a window shade and insert attached to the back of a honeycomb shade, according to the concepts described herein.
Figure 7B:
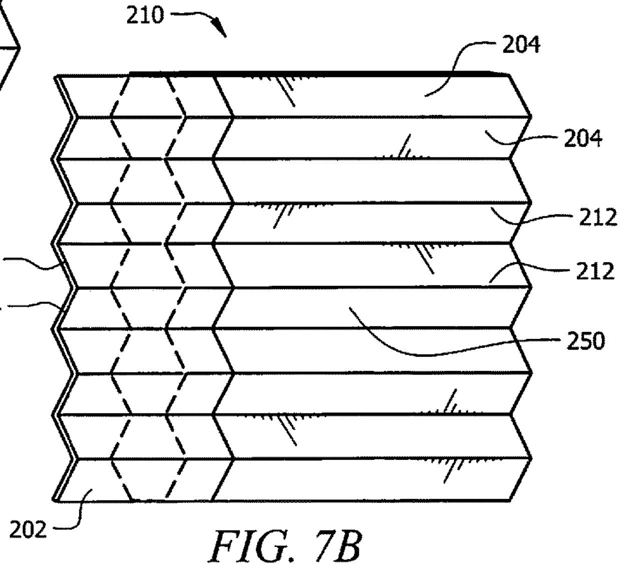
FIG. 7B is a front view of the insert of FIG. 7A extended past an edge of the window shade.

In another embodiment of the invention the inserts 202 are not placed within the cells 212 of the honeycomb shade 210, but are instead attached outside of the cells 212 on a face or backing 250 of the shade 210. FIGS. 7A, 7B, show examples of this embodiment. In this embodiment the inserts 202 are attached to the face/backing 250 of the cells 212 of the honeycomb shade 210. Various means for attachment are compatible with the invention. In the embodiment of FIG. 7A the shade 210 is shown without an attachment. FIG. 7B shows the inserts 202 attached to the shade 210. The inserts 202 comprise two pleats 244 for each cell 212, with pleats 244 matching the pleats 204 of the honeycomb shade 210. A possible attachment may be by adhesive or mechanical attachment at the top or bottom of the honeycomb shade 210. In this embodiment the inserts 202 are attached to the face/backing 250 of the honeycomb shade 210 and extend beyond the distal edge 206 of the shade 210, increasing the coverage area of the shade 210. This embodiment can be used in combination with other window shades, such that inserts 202 extend from one shade 210 and go behind the edge of a neighboring window shade. This will block the sunlight coming through the gap between the window shades.

Figure 8A:
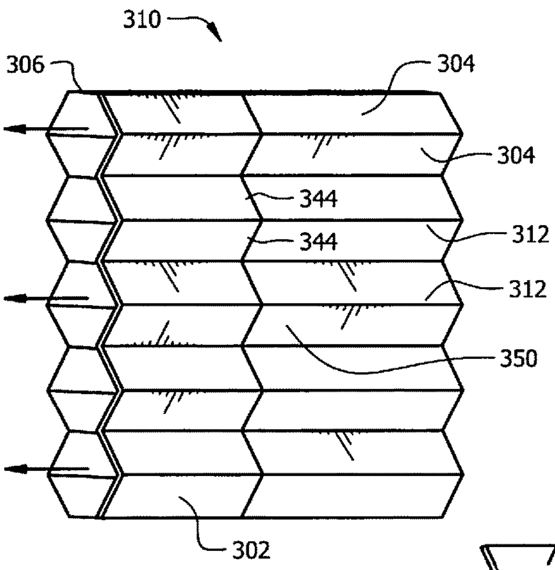
FIG. 8A is a is a front view of an alternate embodiment of a window shade and slidable insert attached to the back of a honeycomb shade, according to the concepts described herein.
Figure 8B:
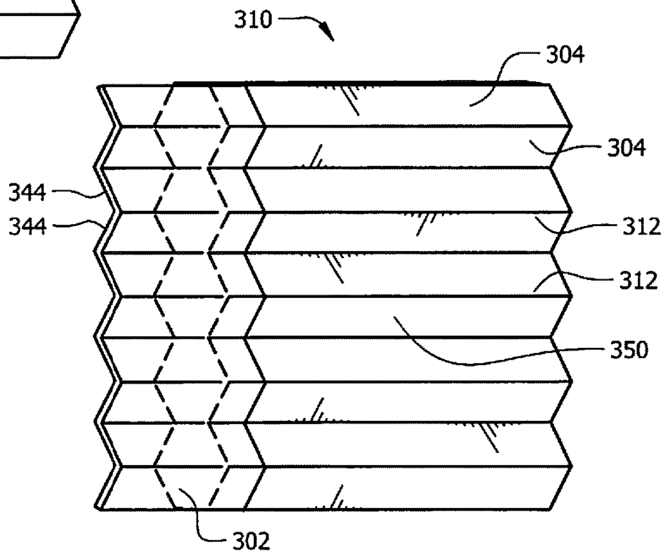
FIG. 8B is a front view of the insert of FIG. 8A extended past an edge of the window shade.

In the embodiment of FIGS. 8A and 8B, the inserts 302 comprise a two-pleat 344 embodiment that is slidably attached to the shade 310 on its face/backing 350. FIG. 8A shows the inserts 302 in a stowed position, unextended. FIG. 8B shows the inserts 302 extended from the edge 306 of the shade 310 and providing more coverage area. Similar to the embodiment of FIGS. 7A and 7B, the inserts of FIGS. 8A and 8B can extend behind the edge of a neighboring window shade to block the sunlight passing through the gap between the window shades.

In many embodiments of the invention, it will be possible to have extendable edges or inserts installed on both distal edges of a honeycomb shade. In such an embodiment the inserts can be extended from each edge of the shade, greatly increasing the coverage area of the shade.

Figure 9:
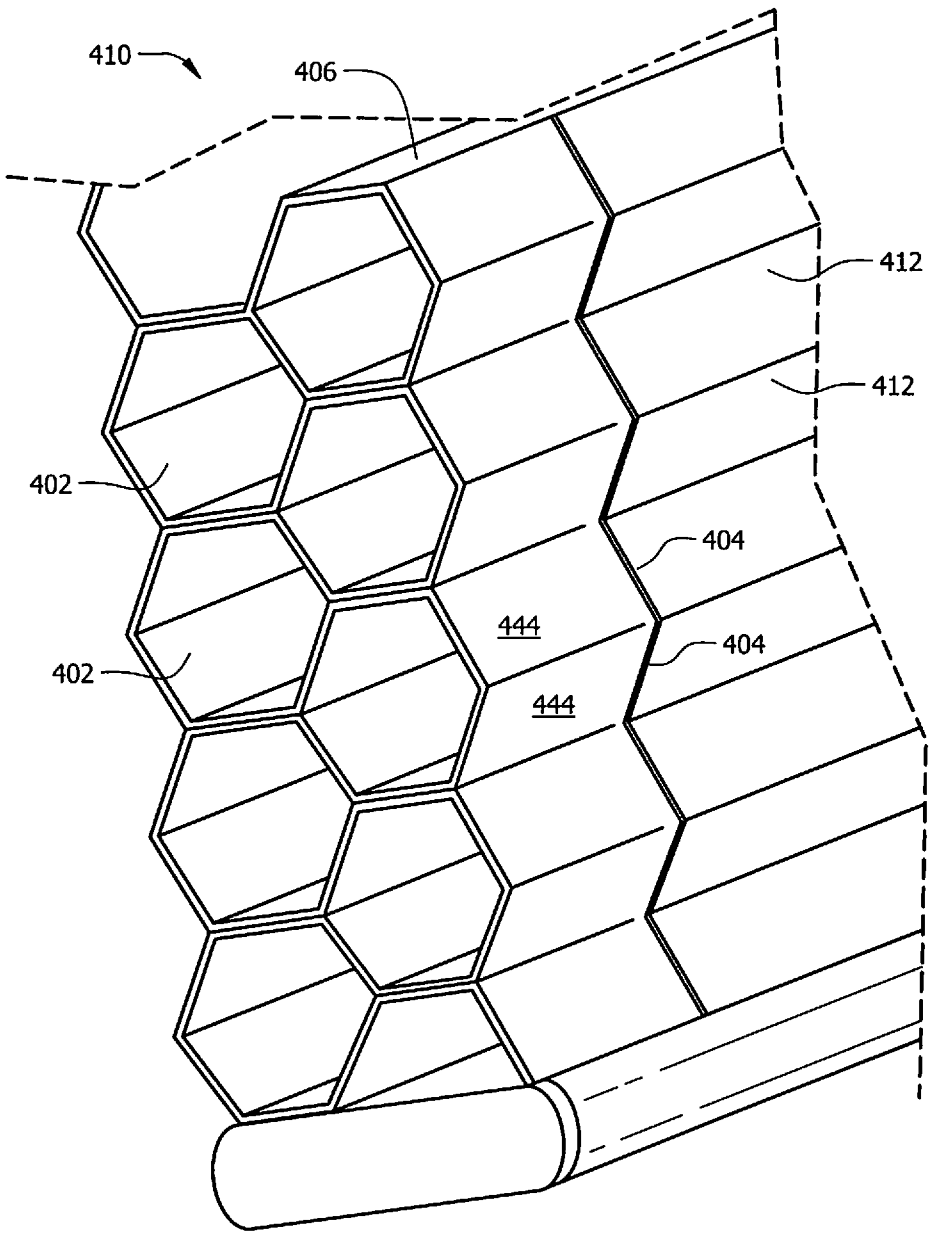
FIG. 9 is a double honeycomb configuration of the current invention.

The invention is also adaptable to double honeycomb, triple honeycomb, and multiple honeycomb shade arrangements. As seen in FIG. 9, inserts 402 can be placed into each cell 412 in a multiple honeycomb shade 410 and connected as in other embodiments such that the inserts 402 are able to slide out of the cells 412 of the honeycomb shade 410. In multiple honeycomb shades 410 many pleats 404 are shared by adjoining cells 412. Inserts 402 can use similar construction techniques with inserts 402 from adjacent cells 412 being connected together at a distal edge 406 of the shade 410. Other details and embodiments regarding shapes and construction can be implemented on a multiple honeycomb shade similar to single honeycomb embodiments described in this specification.

The extendable edges or inserts of the invention can be composed of a variety of materials. The typical user will likely prefer the inserts to match the pattern and material of the honeycomb shade they are attached to. Possible materials for honeycomb shades are various textiles and fabrics. Cotton, linen, polyester blends, nylon and other materials can be used. Some embodiments may user harder materials such as plastic, metal mesh, wood or a variety of other materials.

Inserts as seen in FIGS. 6A-8B may be slidable with respect to the window. To make the inserts slidable each pleat of the insert will be slidably inserted into tracks along each pleat, or a tab 165 maybe located along the bottom edge of each pleat to hold the insert in place while permitting slidable movement. Other means are possible as well that permit slidable movement while maintaining the inserts in place within the cells or along the back of the window shade.

The typical honeycomb shade uses a hexagon shaped cell. But other shapes can be used as well. Cells with a circular or rounded cross-section can be implemented as can squares, triangles, and a variety of other shapes or combinations of shapes. Variously shaped cross-sections can be implemented in keeping with the spirit of the invention.

Another embodiment of the invention can involve multiple groups of inserts connected together along an edge of a honeycomb shade. For example, if a honeycomb shade comprises fifty tubular cells, the extendable inserts can be grouped into groups of ten. In this arrangement the top group of ten inserts will be connected together, with their own nub, and can be slidably adjusted independent from inserts in the other cells. The next ten inserts can be connected together, and so on. In this arrangement the groups of inserts provide the user with increased adaptability and multiple configurations for covering a window.

Some honeycomb shades use double-layered fabric to increase the amount of sunlight blocked or increase the strength of the shade or for some other purpose. The invention can be implemented with double-layered fabric similar to the embodiments described herein. Furthermore, it is possible to implement multiple layers of inserts within a single cell. In such embodiments a user can extend one insert from a cell, or multiple inserts from the same cell to increase the sunlight blocked by the extended edges.

As discussed above, there are numerous ways that honeycomb shades implement lift functionality. Often the strings are passed through the cells of the shade, through holes in the top and bottom pleats of each cell. There are often four sets of string: two generally on the left hand side of the shade and two more generally on the right hand side of the shade. These are often placed several inches or more from each distal edge of the shade. The extendable inserts or edges of the invention can be configured in a variety of ways to not impede the lift functionality of the shade. In one embodiment the insert does not extend within the cells of the shade a distance long enough to encroach upon the drawstrings. Alternatively, if the inserts are long enough to encroach upon the drawstrings, then the inserts may need to be adjusted accordingly. One possible embodiment is to use inserts 2 with only two pleats 4 such as an embodiment described above and in FIGS. 5A and 5B. Another embodiment is to use a cellular insert with a cross section that is substantially thinner than the cell of the shade, such that the drawstrings will pass through the cell and be spaced apart a width larger than the width of the cross section of the insert. It is also possible to provide slits lengthwise along the top and bottom pleats of the inserts, such that space is provided for the drawstrings to pass and the inserts can still be slidably displaced along the length of the cells of the shade.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A window shade comprising:

a top rail;

a shade body extending down from the top rail and comprised of a plurality of collapsible tubular cells stacked to form a vertical shade, each of the tubular cells having at least one open distal end;

an insert comprised of a second plurality of collapsible cells and separable from the shade body, the second plurality of collapsible cells freestanding at one end and comprising connections at a distal end between adjacent cells of the second plurality of collapsible cells, each of the second plurality of collapsible cells configured to extend into a respective one of the plurality of collapsible tubular cells, wherein the insert extends a distance beyond the distal end of the shade body to increase an effective width of the window shade, and wherein the second plurality of collapsible cells is configured to be moved independently of and in unison relative to the shade body to vary the distance.

2. The window shade of claim 1, wherein the collapsible tubular cells of the shade body have a hexagonal cross section at the at least one open distal end.

3. The window shade of claim 1, wherein the collapsible tubular cells of the shade body have a rounded cross section at the at least one open distal end.

4. The window shade of claim 1, wherein the second plurality of collapsible cells are attached to each other with one of the following: glue, adhesive, staple or a sewn connection.

5. The window shade of claim 1, wherein each of the second plurality of collapsible cells is tubular.

6. The window shade of claim 1, wherein each of the second plurality of collapsible cells comprises two pleats.

7. The window shade of claim 1, wherein the window shade is a multiple honeycomb shade.

8. The window shade of claim 1, wherein the window shade is a honeycomb shade.

9. The window shade of claim 1, wherein the insert comprises:

an insert portion extending into the cellular portion of the shade;

an extension, connected to the insert portion, and extending to form a planar area generally co-planar with a back face of the window shade and operable to extend the effective width of the window shade.

10. A method of using the window shade of claim 1 comprising:

providing the shade body comprised of the plurality of collapsible tubular cells stacked to form the vertical shade, each of the collapsible tubular cells having the at least one open distal end;

placing the second plurality of collapsible cells into the at least one open distal end of the collapsible tubular cell, each of the second plurality of collapsible cells sized to insert into the at least one open distal end of the collapsible tubular cells of the shade body, wherein the insert extends a distance beyond the at least one open distal end of the shade body to increase the effective width of the window shade; and moving the second plurality of collapsible cells relative to the shady body to vary the distance.

11. The method of claim 10, wherein the plurality of collapsible tubular cells have a hexagonal cross section.

12. The method of claim 10, wherein the plurality of collapsible tubular cells have a circular cross section.

13. The method of claim 10, wherein the second plurality of collapsible cells are attached to each other with one of the following: glue, adhesive, staple and a sewn connection.

14. The method of claim 10, wherein the second plurality of collapsible cells is tubular.

15. The method of claim 10, wherein the second plurality of collapsible cells is formed by two pleats.

* * * * *